Feb. 7, 1933. W. STEIN 1,896,724
FEEDING APPARATUS FOR MILL ROLLS
Filed Dec. 3, 1931
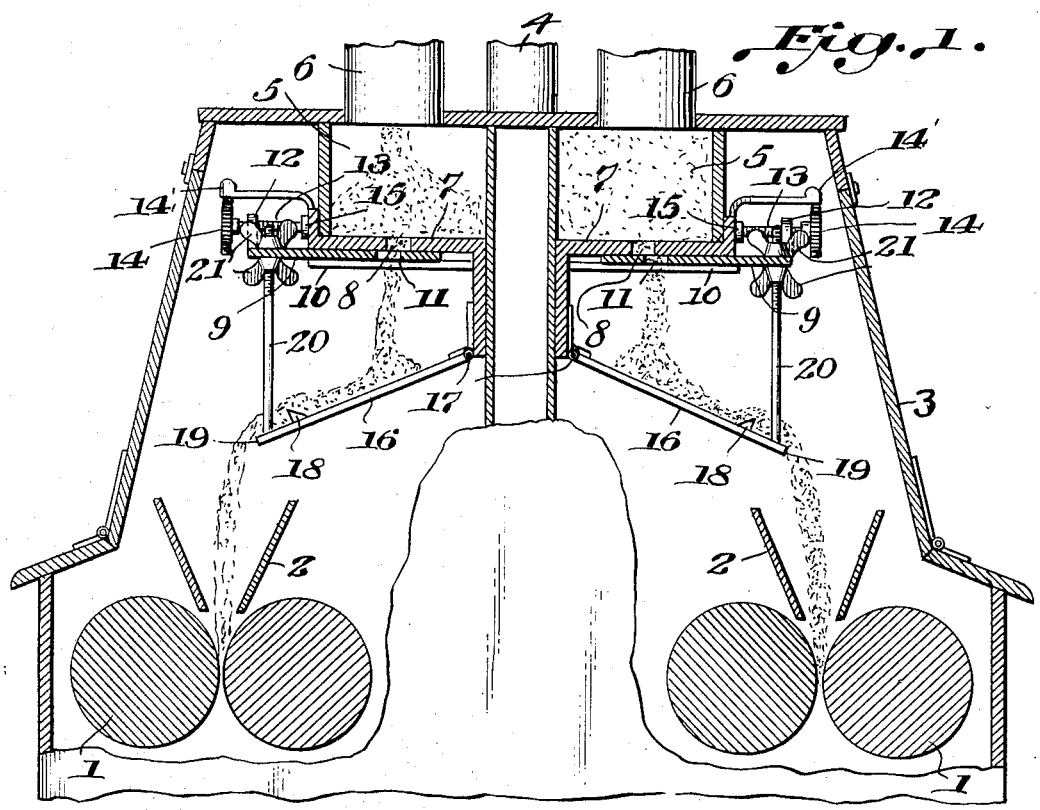
Fig. 1.
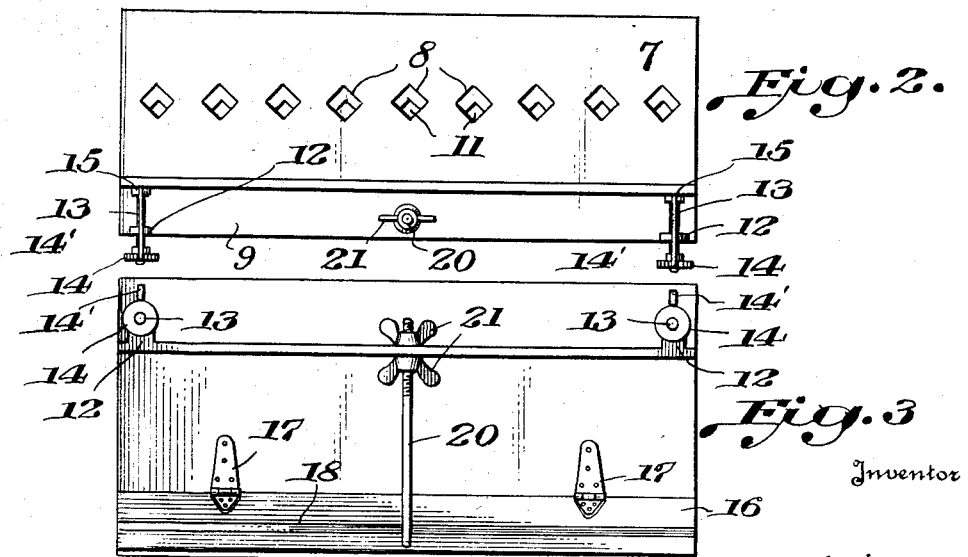
Fig. 2.
Fig. 3.
Inventor
William Stein
Attorney Patented Feb. 7, 1933

1,896,724

UNITED STATES PATENT OFFICE

WILLIAM STEIN, OF EVANSVILLE, INDIANA

FEEDING APPARATUS FOR MILL ROLLS

Application filed December 3, 1931. Serial No. 578,821.

This invention relates to an improved apparatus for controlling the feed of material to any mill rolls, more particularly, to controlling the feed of wheat to the rolls of a flour mill.

My object is to provide an improved gravity feeding apparatus for the aforesaid proposition which may be applied to the material-containing bin, for example, the wheat bin of a flour mill, to regulate the flow of grain to the first feed rolls.

The invention resides in the improved combination of valve and feed board hereinafter described and claimed.

The invention is illustrated in connection with the bins and rolls of a flour mill but I do not limit it to that particular use as it may be used in connection with any machine or in any location where it is necessary to control the feed of granular or similar material.

In the accompanying drawing;

Figure 1 is a vertical section showing the invention applied to a flour mill;

Fig. 2 is a detail plan view of one of the valves and its adjusting means; and

Fig. 3 is an elevation looking toward the end of the valve and the feed board.

The rolls 1 are arranged for the delivery of the wheat thereto from the hoppers 2 which receive the wheat fed by my approved feed apparatus.

The housing for the rolls and the feeding apparatus appears at 3.

The usual vacuum pipe is shown at 4 and the feed pipes which deliver the wheat to the bins 5, appear at 6.

The bottoms 7 of the bins 5 are provided with a row or diamond-shape feed openings 8 through which the grain may descend, according to the setting of the feeding apparatus.

Below the bottoms 7 are slide valves or shutters 9 which are supported on guides 10 for lateral adjustment. The slides 9 are provided with diamond-shape feed openings 11 which may be brought more or less into register with the feed openings 8, thereby to determine the extent to which the grain or other material may pass.

To effect adjustment of the valves or shutters 9, they are provided with extensions 12 through which are threaded screws 13 which have hand wheels 14, said screws being engaged with the bottoms 7 of the bins 5. By turning the screws 13, the slides 9 may be moved inwardly or outwardly to expose more or less of the areas of the openings 11 to the openings 8, thus regulating the gravital feed of the material 5.

Located below the slides 9 are feed boards 16 which are hinged at 17, enabling them to be inclined to greater or lesser extent, according to the rate of feed desired. These boards 16 are provided with fillets or riffles 18 in the region of their discharge edges 19. The purpose of the riffles or fillets 18 is to baffle or check the flow of the material to cause it to distribute itself in uniform feed the entire length of the boards 16 so that it will descend as a sheet into the hopper 2.

Suspending screws 20 which are connected to the free lower parts of the boards 16, and which pass through the valves or slides 9, are provided with upper and lower winged nuts; by adjusting the winged nuts 21, the boards 18 may be disposed in any desired inclination and retained where adjusted. The further these boards are lowered, the faster will be the discharge of the material into the hoppers 2 and the more nearly the boards are disposed horizontally, the feed of the material will be correspondingly lessened.

By adjusting the valves 9 and the boards 16, any desired feed may be obtained. By suitable adjustment of the slides 9, the openings 8 may be completely closed to entirely cut off the feed.

The adjusting screw 13 may be locked by any suitable means such as a brake 14' engaged with the head 14 of the feed screw.

What I claim is:

1. In a feeding apparatus for mill rolls, the combination with a bin or reservoir for the material, and a valve for regulating the discharge of the material from said bin or reservoir, of a feed board arranged to receive the material discharged from said bin under the control of said valve and which is adapted for disposition at different angles of inclination, and adjusting means for said feed board which connects it to said valve.

2. In a feeding apparatus for mill rolls, the combination with a bin or reservoir for the material, of a slide valve controlling the discharge of the material therefrom, means for adjusting said slide valve, a hinged feed board arranged to receive the material discharged from said bin under the control of said slide valve, and means connecting said board to said valve by which the board may be adjusted to different angles of inclination when the valve is in different positions, thereby to regulate the discharge of the material from the board to the mill rolls.

In testimony whereof I affix my signature.

WILLIAM STEIN.